US012050149B2

United States Patent
Cote et al.

(10) Patent No.: US 12,050,149 B2
(45) Date of Patent: Jul. 30, 2024

(54) OPTICAL FIBER ENDFACE INSPECTION MICROSCOPE HAVING A SWAPPABLE OPTICAL HEAD

(71) Applicant: EXFO Inc., Quebec (CA)

(72) Inventors: Olivier Cote, Quebec (CA); Aymen Salahddine, Quebec (CA); Mario L'Heureux, Levis (CA)

(73) Assignee: EXFO Inc., Quebec (CA)

( * ) Notice: Subject to any disclaimer, the term of this patent is extended or adjusted under 35 U.S.C. 154(b) by 320 days.

(21) Appl. No.: 17/455,229

(22) Filed: Nov. 17, 2021

(65) Prior Publication Data

US 2022/0170816 A1 Jun. 2, 2022

Related U.S. Application Data

(60) Provisional application No. 63/203,758, filed on Jul. 30, 2021, provisional application No. 63/175,980, (Continued)

(51) Int. Cl.
*G01M 11/00* (2006.01)
*G02B 6/36* (2006.01)
(Continued)

(52) U.S. Cl.
CPC ........... *G01M 11/31* (2013.01); *G02B 6/3624* (2013.01); *G02B 21/02* (2013.01); *G06T 7/0004* (2013.01);
(Continued)

(58) Field of Classification Search
CPC .......... G06V 10/10; G06T 2207/10056; G06T 2207/30164; G06T 7/0004; G02B 21/02;
(Continued)

(56) References Cited

U.S. PATENT DOCUMENTS 5,119,238 A * 6/1992 Igarashi ................... G02B 9/34
359/716
6,287,020 B1 9/2001 Osaka et al.
(Continued)

FOREIGN PATENT DOCUMENTS

JP 2015118036 6/2015

OTHER PUBLICATIONS

Wilson, Andrew, Telecentric lenses focus on machine vision, Vision Systems Design Company, Jan. 1, 2004. [retrieved on Dec. 17, 2020] Retrieved from the Internet:<URL:https://www.vision-systems.com/print/content/16737545>.

*Primary Examiner* — Hina F Ayub
(74) *Attorney, Agent, or Firm* — Helene Chotard

(57) ABSTRACT

There is provided an optical-fiber connector endface inspection microscope system for inspecting an endface of an optical-fiber connector. It comprises one or more image detector for capturing at least one image of the endface to be inspected; an objective lens system comprising a focusing lens for adjusting a focus of the objective lens system on the image detector and a fixed relay lens; a main housing structure enclosing the image detector and the focusing lens; and at least one interchangeable optical head releasably connectable to the main housing structure and enclosing the fixed relay lens, wherein the optical head is releasably connectable to an adapter tip for interfacing with the optical-fiber connector to be inspected.

13 Claims, 7 Drawing Sheets

Related U.S. Application Data filed on Apr. 16, 2021, provisional application No. 63/118,789, filed on Nov. 27, 2020.

(51) Int. Cl.
 *G02B 21/02* (2006.01)
 *G06T 7/00* (2017.01)
 *G06V 10/10* (2022.01)

(52) U.S. Cl.
 CPC .... *G06V 10/10* (2022.01); *G06T 2207/10056* (2013.01); *G06T 2207/30164* (2013.01)

(58) Field of Classification Search
 CPC .... G02B 6/3624; G02B 6/385; G02B 6/3885; G01M 11/31
 See application file for complete search history.

(56) References Cited

U.S. PATENT DOCUMENTS

| | | | |
|---|---|---|---|
| 9,880,359 | B2 | 1/2018 | Morin-Drouin et al. |
| 10,175,142 | B2 | 1/2019 | Lafrance et al. |
| 10,649,154 | B1 * | 5/2020 | Zhou ................... G02B 6/403 |
| 2014/0327735 | A1 | 11/2014 | Ruchet et al. |
| 2016/0341904 | A1 * | 11/2016 | Morin-Drouin ..... G02B 6/3628 |
| 2017/0003195 | A1 | 1/2017 | Lafrance et al. |
| 2019/0391041 | A1 | 12/2019 | Baribault |

* cited by examiner

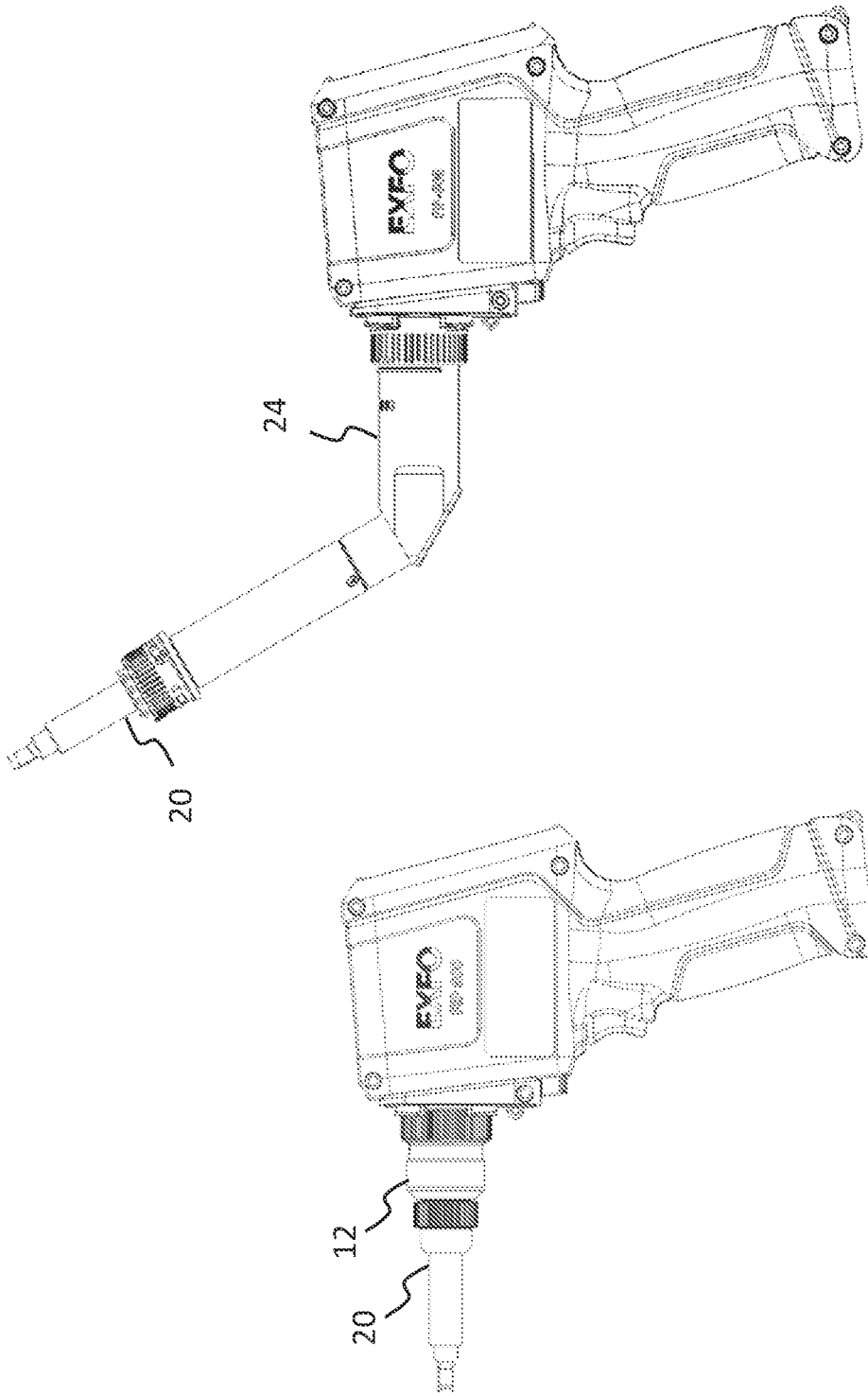

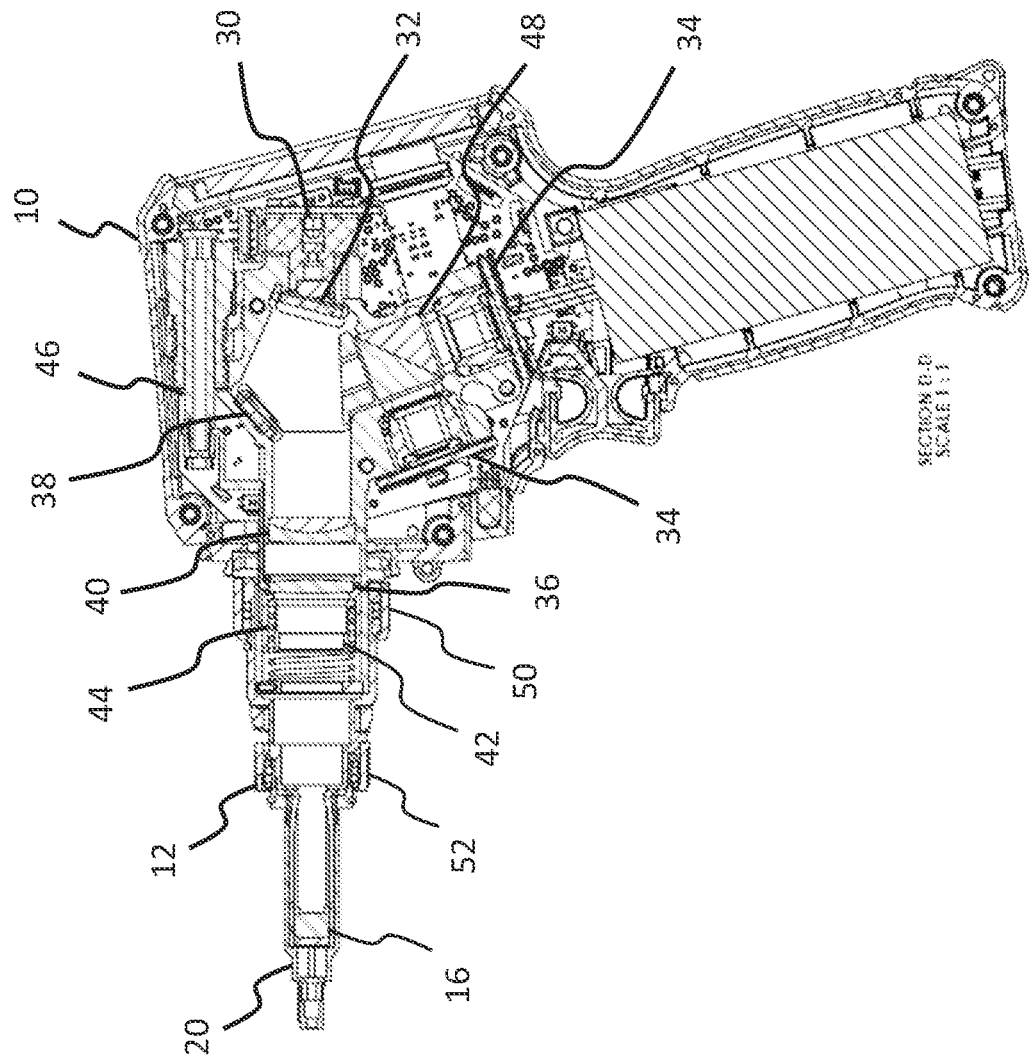
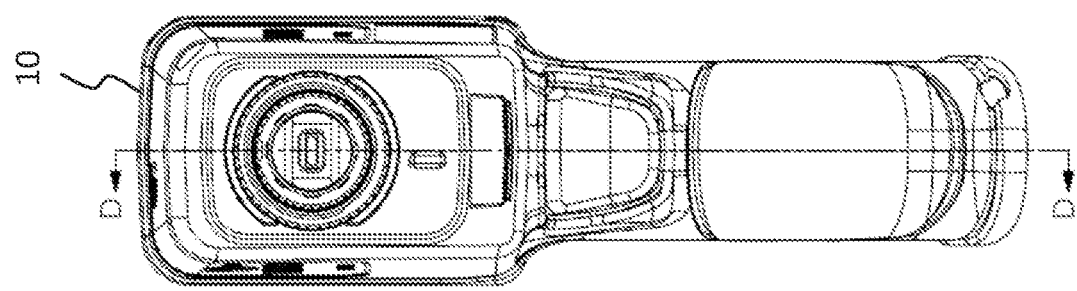
Fig. 4B
Fig. 4A

OPTICAL FIBER ENDFACE INSPECTION MICROSCOPE HAVING A SWAPPABLE OPTICAL HEAD

TECHNICAL FIELD

The present description generally relates to inspection of optical-fiber connector endfaces, and more particularly to optical-fiber connector endface inspection microscopes adapted to inspect various types of optical-fiber connectors.

BACKGROUND

The quality and cleanliness of endfaces of optical-fiber connectors represent important factors for achieving adequate system performance of optical communication networks. Indeed, any contamination of or damage on the mating surface of an optical-fiber connector may severely degrade signal integrity. Optical-fiber inspection microscopes are commonly employed to visually inspect and/or to analyze the optical-fiber endface of an optical-fiber connector at installation or during maintenance of optical communication networks, in order to verify the quality of the optical-fiber connection.

Because of the wide variety of optical-fiber connector types deployed in the telecommunication industry, optical-fiber connector endface inspection microscopes are typically employed with interchangeable adapter tips so as to allow inspection of various types of optical-fiber connectors directly or as inserted in an optical-fiber connector adapter. Optical-fiber connector endface inspection microscopes are therefore typically designed for use with an adapter tip selected among a plurality of adapter tip types.

Optical-fiber connectors now used in the industry can be split in two main categories, i.e., single-fiber connectors and multi-fiber connectors. Nowadays, optical-fiber connector endface inspection microscopes also need to support all these types of connectors.

To be able to efficiently inspect optical-fiber connectors, the inspection tip of the inspection microscope, as well as the objective lens must be small enough to avoid any physical interference with adjacent connectors (e.g., in a densely populated patch panel). Users may have to inspect a connector bulkhead while a fiber is connected in the adjacent bulkheads. Most of the time, to disconnect a fiber which may be "live", in order to allow the inspection of an unused connector bulkhead is simply impossible. The region of interest on the multi-fiber ferule is about 4.3 mm wide while the single-fiber is less than 1 mm. Adapter tips and lenses are optimized with these goals and constraints in mind, thereby creating two families of adapter tips, i.e., smaller single-fiber adapter tips and wider mufti-fiber adapter tips.

The traditional approach to conciliate adapter tips and lenses of two different sizes is to add an adaptor so as to either convert a multi-fiber inspection microscope into a single-fiber inspection microscope, or convert a single-fiber inspection microscope into a multi-fiber inspection microscope.

For example, some inspection microscopes are natively multi-fibers and are designed with a field-of-view allowing inspection of the whole endface of a multi-fiber connector. A single-fiber adaptor is added in place of a mufti-fiber adapter tip to accept smaller single-fiber adapter tips. In this case, this is essentially a mechanical adaptor. One main drawback for this solution is to have a single-fiber image quality that is not on par with a dedicated single-fiber inspection microscope using the same adapter tip. More specifically, the single-fiber magnification level and optical path inherit the same compromises made to inspect multi-fiber connectors with 8 to 16 fiber per row.

Furthermore, in some instances, fiber inspection may be made particularly difficult when bulkheads are not well positioned for fiber inspection, e.g., because they are in a deep recess or because the presented angle is far from ideal.

There therefore remains a need for a versatile inspection microscope device that allows optimal connector inspection of both single-fiber and multi-fiber connectors.

SUMMARY

In accordance with one aspect, there is provided an optical-fiber inspection microscope system that can be configured into either a single-fiber inspection microscope or a multi-fiber inspection microscope by using interchangeable optical heads (i.e., single-fiber head or multi-fiber head), including optical elements. Each head is designed specifically for one of the main families of connectors, e.g., single-fiber or multi-fiber, Each optical head brings an optical component usually part of the fiber inspection scope as an external element that is made interchangeable by swapping the optical head. Each optical head includes a head lens that is positioned in the optical head so as to be located close to the connector endface under inspection, allowing the use of inexpensive adapter tips without lenses in order to complete the adaptation to each connector "sub-type" (e.g., MPO APC, MPO UPC, Optitip, Q-ODC, etc.). These adapter tips are interchangeably connectable to their corresponding optical head.

A user who wants to switch from one family of connectors to another can simply swap the optical head. Switching from one to another does not add any extra optical and mechanical components in the optical path and the image quality and size of the inspection microscope system can be optimal for either single-fiber or multi-fiber connector inspection. Switching heads instead of adding an adaptor may also provide the benefit of minimizing the mechanical tolerance stack-up of the system. Mechanical tolerances can become very critical when designing optical-fiber inspection microscope systems, especially when the system needs to adapt to various multifiber connectors or other particular connectors. Minimizing the mechanical tolerance stack-up can be key.

This solution also brings any moving optical elements used for image focus inside the optical-fiber inspection microscope, and further away from the inspected connector endface. In this solution, the first lens (head lens), which is the closest to the inspected connector endface is fixed, whereas the second lens is moveable for adjusting the focus.

One drawback of having one moving lens and one fixed is that, without any special care, the magnification level could then depend upon the focus (i.e., the position of the focusing lens). However, optical-fiber inspection microscopes are not only required to produce high-quality images on small elements, but they are also required to precisely measure defects on inspected optical fiber connector endfaces. Having different magnification levels can be problematic for such applications. This drawback may be overcome by providing a telecentric objective comprising a telecentric aperture stop.

Another issue related to the focus being done by the second group of lenses is the higher level of mechanical tolerance and more importantly the level of positioning precision being required. This issue may be solved herein by arranging the optical components in a way which allows a longer travel for the focusing lenses to achieve a similar focus range on the object.

In accordance with one aspect, there is provided an optical-fiber connector endface inspection microscope system for inspecting an endface of an optical-fiber connector. The optical-fiber connector endface inspection microscope system comprises one or more image detector(s) for capturing at least one image of the endface to be inspected; an objective lens system comprising a focusing lens for adjusting a focus of the objective lens system on the image detector and a fixed relay lens; a main housing structure enclosing the image detector and the focusing lens; and at least one interchangeable optical head releasably connectable to the main housing structure and enclosing the fixed relay lens, wherein the optical head is releasably connectable to an adapter tip for interfacing with the optical-fiber connector to be inspected.

In some embodiments, the at least one interchangeable optical head may comprise a multi-fiber optical head and a single-fiber optical head, mutually interchangeable; wherein the multi-fiber optical head is releasably connectable to a multi-fiber adapter tip configured to interface with multi-fiber optical-fiber connectors and wherein the single-fiber optical head is releasably connectable to a single-fiber adapter tip configured to interface with single-fiber optical-fiber connectors.

In some embodiments, the objective lens system may be configured to form a telecentric objective and may comprise a telecentric aperture stop.

In some embodiments, the aperture stop may be positioned at or near the focal point of the objective lens system.

In some embodiments, the aperture stop and the focusing lens may be together mounted in a lens holder, wherein a distance between the aperture stop and the focusing lens remains fixed during focus.

In some embodiments, focus may be adjusted by displacing the lens holder, thereby moving the focusing lens and the aperture stop; the relay lens of the objective lens system remaining fixed within the inspection microscope system during focus adjustment.

In some embodiments, the objective lens system may further comprise a fixed lens enclosed within the main housing structure, wherein during focus adjustment, the fixed lens remains fixed within the inspection microscope system.

In some embodiments, the at least one interchangeable optical head may comprise an angled optical head and a linear optical head, mutually interchangeable.

In some embodiments, the adapter tip may have a substantially elongated hollow member and the optical head be configured so that, when interconnected, at least part of the optical head interlocks into the hollow member of the adapter tip so that the relay lens of the optical head is positioned within the adapter tip.

In accordance with one aspect, there is provided an optical-fiber connector endface inspection microscope system for inspecting an endface of an optical-fiber connector. The optical-fiber connector endface inspection microscope system comprises: one or more image detector(s) for capturing at least one image of the endface to be inspected; an objective lens system comprising a focusing lens for adjusting a focus of the objective lens system on the image detector; a main housing structure enclosing the image detector and the focusing lens; and a multi-fiber optical head comprising and a single-fiber optical head, configured to interchangeably and releasably connect to the main housing structure and each enclosing a fixed relay lens; wherein the multi-fiber optical head and a single-fiber optical head are each releasably connectable to an adapter tip for interfacing with the optical-fiber connector to be inspected.

In some embodiments, the optical-fiber connector endface inspection microscope system may further comprise: at least one multi-fiber adapter tip releasably connectable to the multi-fiber optical head and comprising a multi-fiber optical-fiber connector interface for mechanically engaging with a multi-fiber optical-fiber connector to be inspected; and at least one single-fiber adapter tip releasably connectable to the single-fiber optical head and comprising a single-fiber optical-fiber connector interface for mechanically engaging with a single-fiber optical-fiber connector to be inspected.

In some embodiments, the relay lens of the multi-fiber optical head and the relay lens of the single-fiber optical head have mutually different dimensions.

BRIEF DESCRIPTION OF THE DRAWINGS

FIG. 2 is a side elevation view of the inspection microscope system of FIG. 1.

FIG. 3 is a side elevation view of an optical-fiber connector endface inspection microscope system in accordance with one embodiment comprising an angled optical head.

FIG. 4 comprises FIG. 4A, FIG. 4B and FIG. 4C wherein FIG. 4A is a front elevation view of the inspection microscope system of FIG. 1; FIG. 4B is a cross-sectional view of the same, taken along line D-D of FIG. 4A.

FIG. 5 comprises FIG. 5A, FIG. 5B and FIG. 5C wherein

FIG. 6 comprises FIG. 6A, FIG. 6B and FIG. 6C wherein

FIG. 7 comprises FIG. 7A, FIG. 7B, FIG. 7C and FIG. 7D wherein

DETAILED DESCRIPTION

Referring to FIGS. 1 to 7, there is provided an optical-fiber inspection microscope system 100 for inspecting an endface of an optical-fiber connector and which can be configured into either a single-fiber inspection microscope or a multi-fiber inspection microscope. The system 100 comprises a main housing structure 10 and mutually interchangeable optical heads, such as a multi-fiber head 12 and a single-fiber head 14.

Figure 5A:
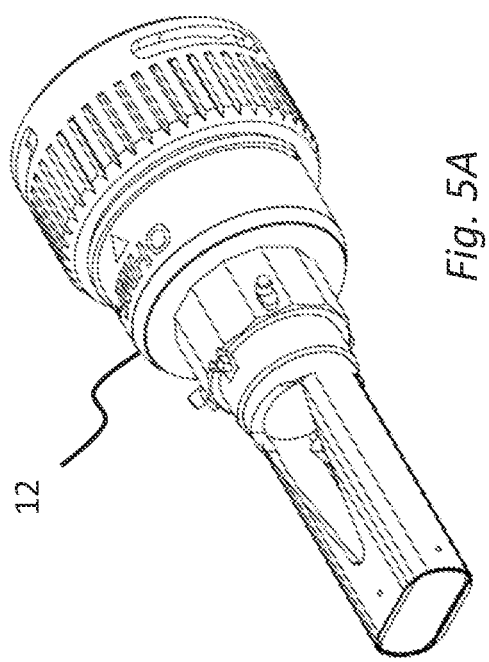
FIG. 5A is an isometric view of the multi-fiber optical head of the inspection microscope system of FIG. 1.
Figure 5C:
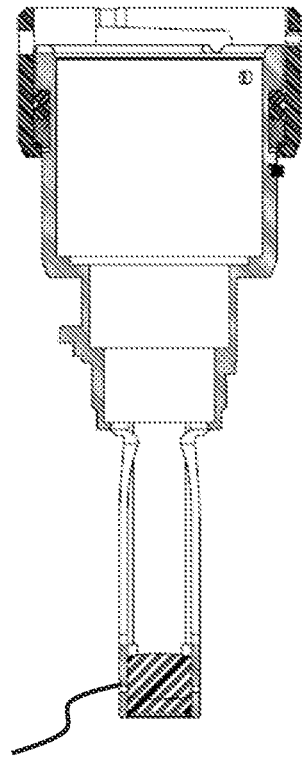
FIG. 5C is a cross-sectional view of the same, taken along line C-C of FIG. 5B.
Figure 5B:
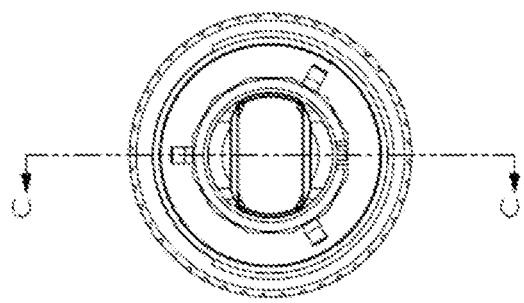
FIG. 5B is a front elevation view of the same.
Figure 6A:
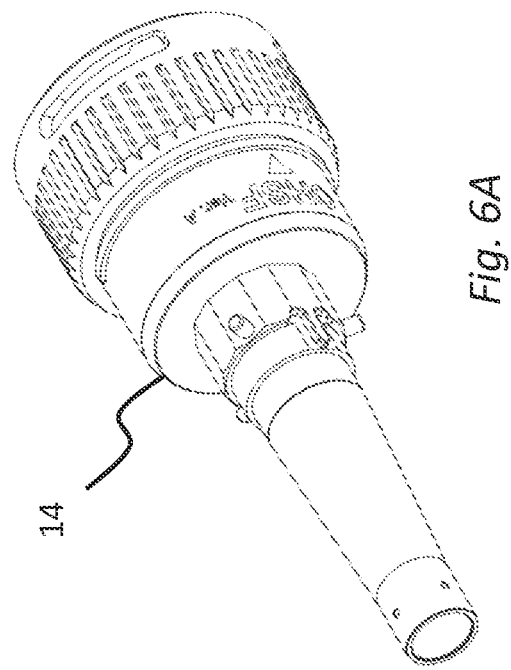
FIG. 6A is an isometric view of the single-fiber optical head of the inspection microscope system of FIG. 1.
Figure 6C:
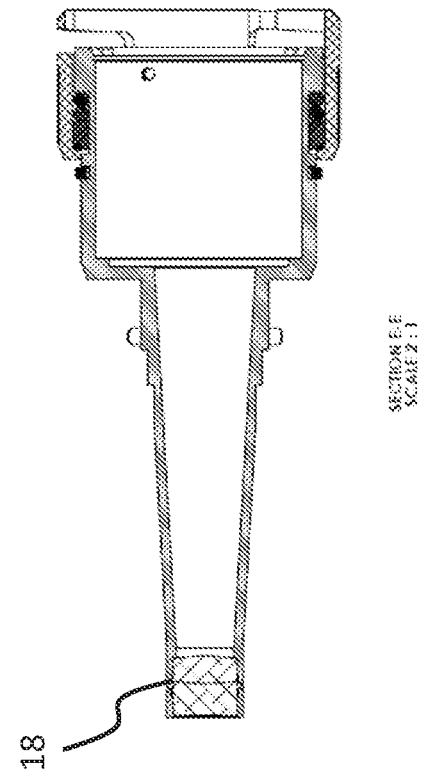
FIG. 6C is a cross-sectional view of the same, taken along line E-E of FIG. 6B.
Figure 6B:
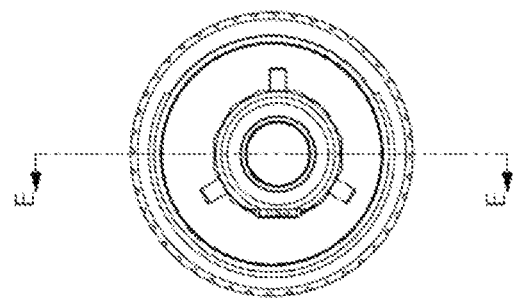
FIG. 6B is a front elevation view of the same.
Figure 7A:
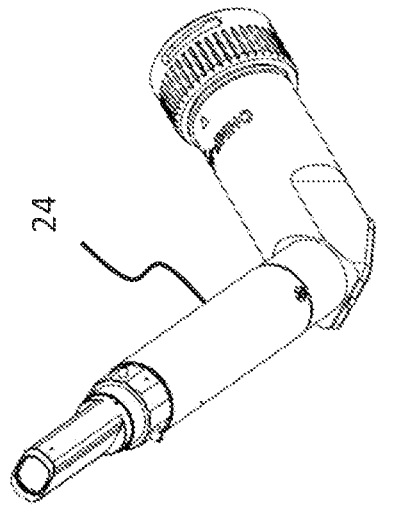
FIG. 7A is an isometric view of the angled optical head of the inspection microscope system of FIG. 1.
Figure 7B:
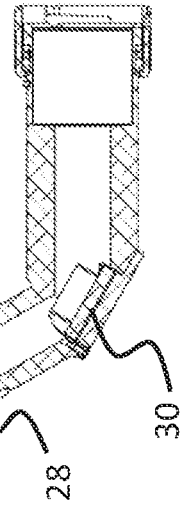
FIG. 7B is a left-side elevation view of the same.
Figure 7C:
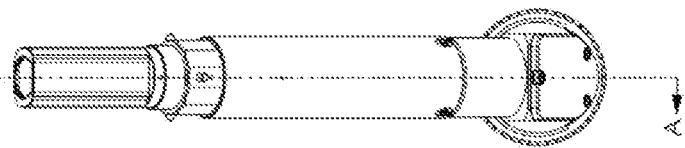
FIG. 7C is a front elevation view of the same.
Figure 7D:
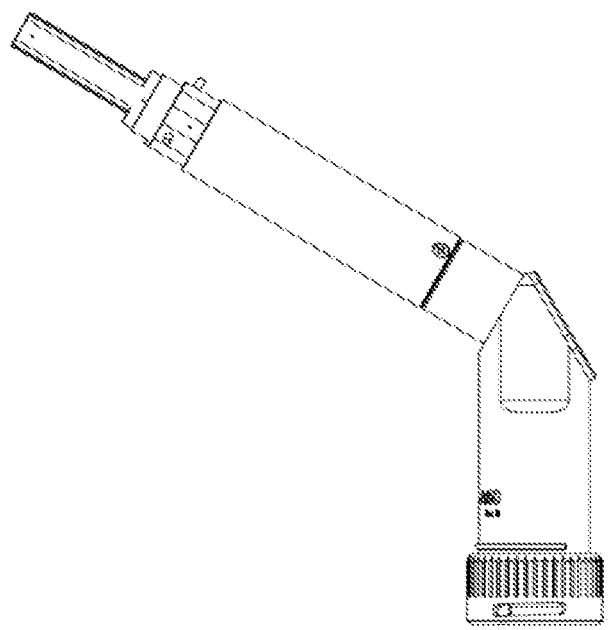
FIG. 7D is a cross-sectional view of the same, taken along line A-A of FIG. 7C.

FIG. 5 shows the multi-fiber optical head 12 in more details and FIG. 6 shows the single-fiber optical head 14 in more details. Each optical head 12, 14 is designed specifically for one of the main families of connectors, e.g., single-fiber or multi-fiber. Each optical head 12, 14 includes a relay lens 16, 18, that is positioned in the optical head so as to be located close to the connector endface under inspection, i.e., near the inspection end of the optical-fiber inspection microscope system 100. Each optical head 12, 14 brings an optical component usually part of the fiber inspection scope (i.e., the relay lens 16, 18) as an external element that is made interchangeable by swapping optical heads 12, 14. This interchangeability allow to configure the inspection microscope system 100 into either a single-fiber or a multi-fiber inspection microscope.

It is noted that the region of interest on a mufti-fiber ferule is about 4.3 mm wide while the single-fiber is less than 1 mm. Knowing that to be able to efficiently inspect optical-fiber connectors, the adapter tip of the inspection microscope, and therefore the optical head must be small enough to avoid any physical interference with adjacent connectors (e.g., in a densely populated patch panel), the mufti-fiber relay lens 16 and the single-fiber relay lens 18 may therefore be optimally made with mutually different dimensions. They may be dimensioned so as to each capture the whole surface of the optical-fiber connector under inspection, while keeping the optical head and adapter tip no bigger than necessary so as to not mechanically interfere with adjacent connectors, The multi-fiber relay lens 16 may therefore be made wider than the single-fiber relay lens 18.

This configuration also allows the use of inexpensive adapter tips, such as tips 20 or 22, which do not include lenses in order to complete the adaptation to each connector "sub-type" (e.g., MPO APC, MPO UPC, Optitip, Q-ODC, etc.). These adapter tips are interchangeably connectable to its corresponding optical head. Each interchangeable adapter tip is configured to interface with one or more specific optical-fiber connector to be inspected. The single-fiber optical head 14 is made releasably connectable to single-fiber adapter tips and the multi-fiber optical head 12 is made releasably connectable to multi-fiber adapter tips.

Users who want to switch from one family of connectors to another can simply swap optical heads 12, 14. Switching from one to another does not add any extra optical and mechanical components in the optical path and the image quality and size of the inspection microscope system can be optimal for both single-fiber and multi-fiber connector inspection. As explained hereinabove, switching heads instead of adding an adaptor may also provide the benefit of minimizing the mechanical tolerance stack-up of the system.

As illustrated herein, adapter tips (20, 22 or other non-illustrated tips) each comprise a substantially elongated hollow member 60 defining a channel 62 between a proximal end 64 and a remote end 66, wherein illumination light may propagate to and back from the inspected connector endface. It further comprises an optical connector interface 68 at its proximal end 64 to mechanically engage with the optical connector (not shown) during inspection, as well as a connection mechanism 52 for releasable connection to the optical head (12, 14, 24 or other non-illustrated optical head) and having complementary engaging features 70, 72 respectively located on the adapter tip and the optical head.

Similarly, optical heads (12, 14, 24 or other non-illustrated optical heads) each comprise a substantially elongated hollow member 80 defining a channel 82 between a proximal end 84 and a remote end 86, wherein illumination light may propagate to and back from the inspected connector endface. It further comprises a relay lens 16 or 18 at its proximal end 64 and a connection mechanism 50 for releasable connection to the main housing 10 and having complementary engaging features 90, 92 respectively located on the optical head and the main housing 10.

When in use for connector endface inspection, at least part of the elongated member 80 of the optical head may interlock into the hollow member 60 of the adapter tip so that the relay lens 16 or 18 of the optical head is positioned within the adapter tip. This configuration allows the relay lens 16 or 18 be located close to the connector endface under inspection, i.e., near the inspection end of the optical-fiber inspection microscope system 100.

Each interchangeable optical head (12, 14, 24 or other non-illustrated optical head) may be made easily releasably connectable to the main housing structure 10 using a connection mechanism 50 such as a screw-threaded mechanism or twist and lock mechanism for example. Similarly, the adapter tip 20 or 22 may be made releasably connectable to the optical head 12 or 14 using a similar connection mechanism 52.

Referring to FIGS. 2, 3 and 7, the interchangeable optical head can also be used to change the orientation of the connector under inspection relative to the optical-fiber inspection microscope in order to allow to reach optical-fiber connector bulkheads that are disposed at an angle within the patch panel.

For such applications, switching heads instead of adding an adaptor may advantageously allow a more ergonomic design. Without interchangeable heads, an angled adapter would need to be inserted between the optical-fiber connector bulkhead to be inspected and the optical-fiber inspection microscope. The overall inspection system would be longer and less ergonomic.

In this case, the optical-fiber inspection microscope system 100 further comprises and angled optical head 24 that is interchangeable with one or more linear optical head such as the multi-fiber head 12 or the single-fiber head 14. FIG. 7 shows the angled optical head 24 in more details, The angled optical head 24 can be made either multi-fiber or single-fiber. The angled optical head 24 also includes a relay lens 26, that is positioned in the optical head so as to be located close to the connector endface under inspection. In addition, the angled optical head 24 further comprises a mirror 30 used to deviate an optical path between the inspected connector endface and the main housing structure 10 and so allow to create an angle in the optical head 24. Depending on the actual design, additional lenses 28 may also be needed in the angled optical head 24 in order to relay the illumination light to and back from the inspected endface and extend the optical path of the angled optical head 24 compared to the single-fiber optical head 14 and the multi-fiber optical head 12.

In some embodiments, the multi-fiber angled head 24 may be manufactured so its proximal portion which inserts in and engage to adapter tips 20 is identical or has substantially the same shape as that of the multi-fiber head 12, so as to allow to interchangeably use the same adapter tips 20 for both heads 12, 24. The same can be applied to a single-fiber angled head and the single-fiber head 14.

Figure 1:
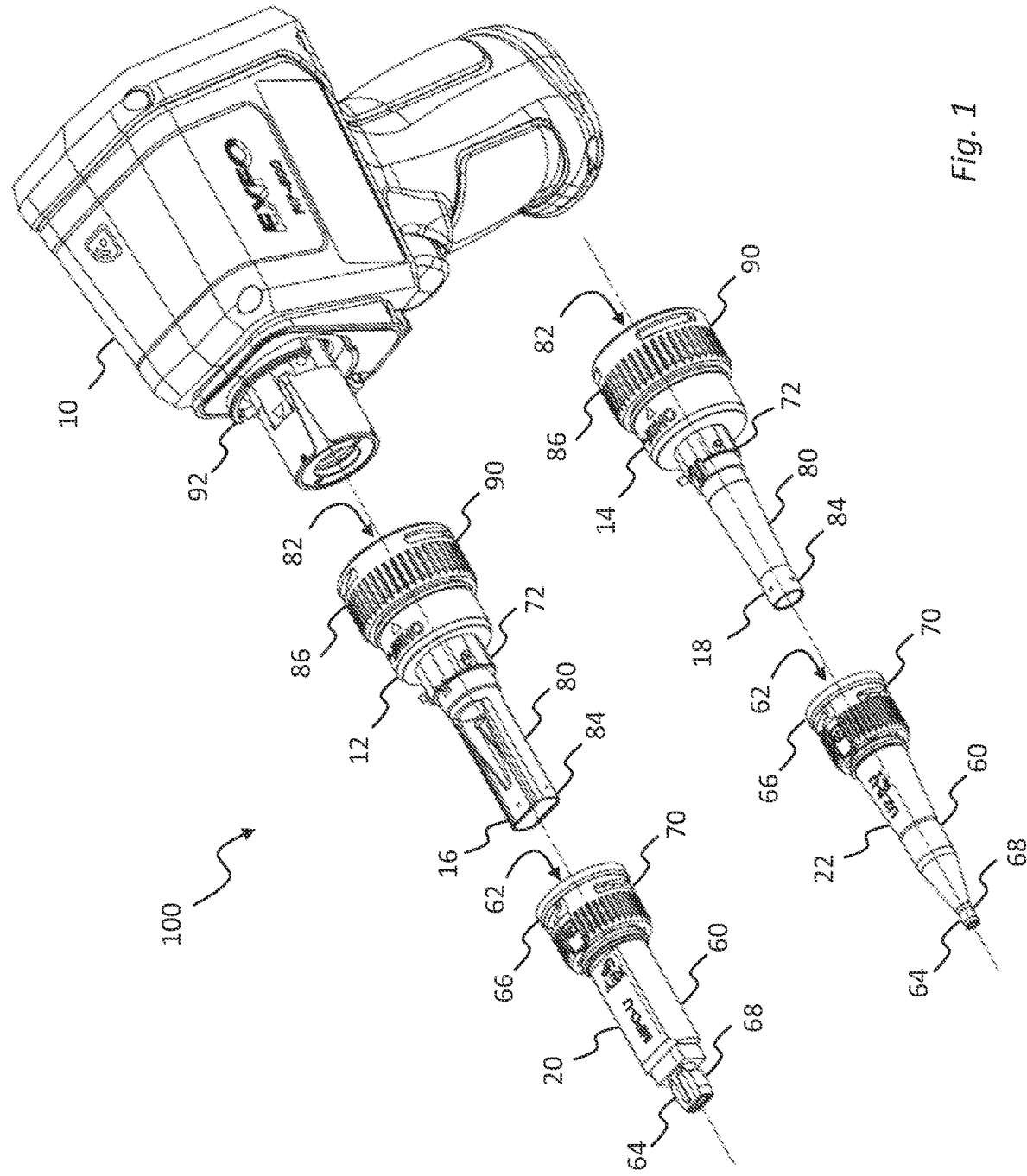
FIG. 1 is an exploded perspective view showing an optical-fiber connector endface inspection microscope system in accordance with one embodiment.
Figure 4C:
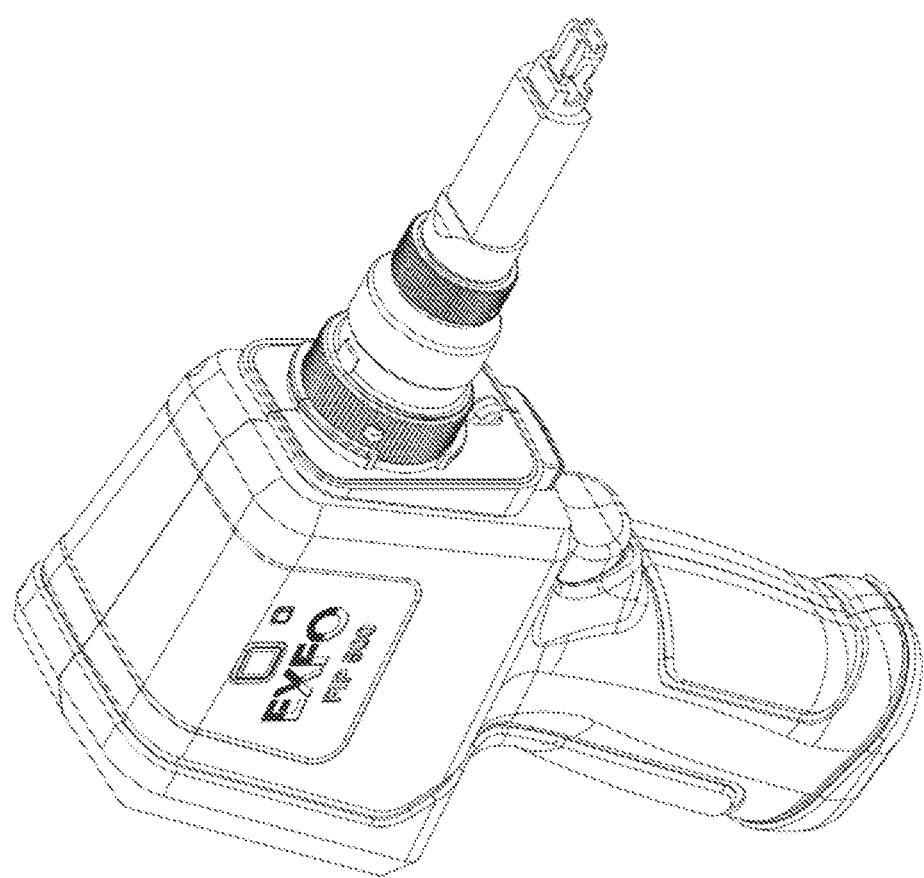
FIG. 4C is a perspective view of the inspection microscope system of FIG. 1.

Referring to FIG. 4, which comprises FIG. 4A and FIG. 4B, the optical-fiber connector endface inspection microscope system 100 of FIG. 1 is shown in more details. In FIG. 4, the inspection microscope system 100 is illustrated with optical head 12 but could likely have been illustrated with optical head 14.

It will be understood that the configuration of FIG. 4B illustrates one example embodiment of an optical-fiber connector endface inspection microscope system. It should be appreciated by those of ordinary skill in the art that various implementations of the inspection microscope can be envisaged as known in the art and that the embodiment illustrated herein is no way meant to be limitative.

Generally, an optical-fiber connector endface inspection microscope system 100 incorporates an imaging assembly comprising an illumination source 30 for illuminating the connector endface to be inspected (not shown), an illumination beam splitter 32 to direct illumination light toward the connector endface, one or more image detector(s) 34 (herein two image detectors) for capturing at least one image of the endface to be inspected, and imaging optics. The imaging optics comprises an objective lens system (and optionally other lenses, mirrors (see, e.g., 38) and/or other optical components (e.g., beamsplitter 48) defining objective optics), for imaging the illuminated connector endface, on the image plane(s) coinciding with the image detector(s) 34. The object plane as defined herein is determined by the objective lens system and coincides with the plane where the connector endface to be inspected (i.e., the object) should be positioned (within the focusing range of the objective lens system) to be suitably imaged on the image detector(s) 34. The optical path between the object plane and the image plane defines an imaging path of the inspection microscope, along which propagates the inspection light beam resulting from a reflection of illumination light on the connector endface, for optical magnification of the object (i.e., the connector endface) positioned on the object plane.

More specifically, the objective lens system comprises a focusing lens 36 for adjusting a focus of the objective lens system on the image detector(s) 34 and a fixed relay lens (here lens 16) disposed in the optical head (here 12), whereas the image detector(s) 34 and the focusing lens 36 are enclosed in the main housing structure 10.

The objective lens system at least comprises the focusing lens 36 for adjusting a focus of the objective lens system on the image detector and a fixed relay lens 16 or 18. In the embodiment of FIG. 4, the focus is adjusted by moving the focusing lens using an actuator 46. It will be understood that the objective lens system may further comprise other lenses or optical elements as required by the optical design, which lenses and optical elements can be either fixed relative to the microscope system or movable, e.g., held fixed with the focusing lens. For example, in the embodiment of FIG. 4, the objective lens system may further comprise lens 40 that is enclosed and held fixed within the main housing structure.

One drawback of having one moving lens and one fixed is that, without any special care, the magnification level could then depend upon the focus (i.e., the position of the focusing lens). However, optical-fiber inspection microscopes are not only required to produce high-quality images on small elements, but they are also required to precisely measure defects on inspected optical fiber connector endfaces. Having different magnification levels can be problematic for such applications. This drawback may be overcome by providing a telecentric objective comprising a telecentric aperture stop.

In the embodiment of FIG. 4, the objective lens system is thereby configured to form a telecentric objective and comprises a telecentric aperture stop 42.

A telecentric aperture stop is an aperture stop that is positioned at the focal point in an optical system, in order to reduce magnification variations caused by a slight displacement of the object plan. Here, the aperture stop is positioned at or near the focal point of the objective lens system, i.e., at or near the focal point of the relay lens 16 or 18.

In the embodiment of FIG. 4, the aperture stop 42 and the focusing lens 36 are together mounted in a lens holder 44. The distance between the two therefore remains fixed during focus. Focus is being adjusted by displacing the lens holder 44 using an actuator 46, thereby moving the focusing lens 36 and the aperture stop 42. During focus adjustment, the relay lens 16 or 18 and other optical elements of the objective lens system remain fixed within the inspection microscope system 100. Consequently, the distance between the aperture stop 42 and the relay lens 16 or 18 varies during focus adjustment but nevertheless remains close to the focal point of the relay lens 16 or 18 so as to obtain a substantially telecentric objective lens system.

Another issue related to the focus being done by the second group of lenses is the higher level of mechanical tolerance and more importantly the level of positioning precision being required. This issue may be solved herein by arranging the optical components in a way which allows a longer travel for the focusing lenses to achieve a similar focus range on the object.

It will be understood that numerous modifications may be made to the embodiments described herein without departing from the scope of the invention.

For example, focus may be adjusted using a deformable focusing lens instead of a movable focusing lens. In such case, both the focusing lens 36 and the relay lens 16 or 18 remain fixed during focus adjustment but the magnification may still depend upon the focus, i.e. the adjusted focal point of the deformable focusing lens. As in the embodiment of FIG. 4, this drawback may be overcome with a telecentric objective comprising a telecentric aperture stop.

The embodiments described above are intended to be exemplary only. The scope of the invention is therefore intended to be limited solely by the appended claims.

The invention claimed is:

1. An optical-fiber connector endface inspection microscope system for inspecting an endface of an optical-fiber connector, the optical-fiber connector endface inspection microscope system comprising:
   one or more image detectors for capturing at least one image of the endface to be inspected;
   an objective lens system comprising a focusing lens for adjusting a focus of the objective lens system on the image detector and a fixed relay lens;
   a main housing structure enclosing the image detector and the focusing lens; and
   a multi-fiber optical head and a single-fiber optical head, releasably and interchangeably connectable to the main housing structure;
   wherein the multi-fiber optical head and the single-fiber optical head each enclose a relay lens which forms the fixed relay lens of the objective lens system when one of the optical heads is connected to the main housing structure; and
   wherein the multi-fiber optical head is releasably connectable to a multi-fiber adapter tip configured to interface with multi-fiber optical-fiber connectors to be inspected and wherein the single-fiber optical head is releasably connectable to a single-fiber adapter tip configured to interface with single-fiber optical-fiber connectors to be inspected.

2. The optical-fiber connector endface inspection microscope system as claimed in claim 1, further comprising:
   at least one multi-fiber adapter tip releasably connectable to the multi-fiber optical head and comprising a multi-fiber optical-fiber connector interface for mechanically engaging with a multi-fiber optical-fiber connector to be inspected; and at least one single-fiber adapter tip releasably connectable to the single-fiber optical head and comprising a single-fiber optical-fiber connector interface for mechanically engaging with a single-fiber optical-fiber connector to be inspected.

3. The optical-fiber connector endface inspection microscope system as claimed in claim 1, wherein the relay lens of the multi-fiber optical head and the relay lens of the single-fiber optical head have mutually different dimensions.

4. The optical-fiber connector endface inspection microscope system as claimed in claim 1, wherein the objective lens system is configured to form a telecentric objective and comprises a telecentric aperture stop.

5. The optical-fiber connector endface inspection microscope system as claimed in claim 4, wherein the aperture stop is positioned at or near the focal point of the objective lens system.

6. The optical-fiber connector endface inspection microscope system as claimed in claim 5, wherein the aperture stop and the focusing lens are together mounted in a lens holder and wherein a distance between the aperture stop and the focusing lens remains fixed during focus.

7. The optical-fiber connector endface inspection microscope system as claimed in claim 6, wherein the focus is being adjusted by displacing the lens holder, thereby moving the focusing lens and the aperture stop; the relay lens of the objective lens system remaining fixed within the inspection microscope system during focus adjustment.

8. The optical-fiber connector endface inspection microscope system as claimed in claim 7, wherein the objective lens system further comprises a fixed lens enclosed within the main housing structure and wherein during focus adjustment, the fixed lens remains fixed within the inspection microscope system.

9. The optical-fiber connector endface inspection microscope system as claimed in claim 1, wherein said multi-fiber optical head is linear and wherein said system further comprises an angled optical head releasably and interchangeably connectable to the main housing structure.

10. The optical-fiber connector endface inspection microscope system as claimed in claim 1, wherein the multi-fiber adapter tip and the single-fiber adapter tip each have a substantially elongated hollow member and wherein the multi-fiber optical head and the single-fiber optical head are each configured so that, when interconnected with their respective adapter tip, at least part of the optical head interlocks into the hollow member of the adapter tip so that the relay lens of the optical head is positioned within the adapter tip.

11. An optical-fiber connector endface inspection microscope system for inspecting an endface of an optical-fiber connector, the optical-fiber connector endface inspection microscope system comprising:
   one or more image detectors for capturing at least one image of the endface to be inspected;
   an objective lens system comprising a focusing lens for adjusting a focus of the objective lens system on the image detector;
   a main housing structure enclosing the image detector and the focusing lens; and
   a multi-fiber optical head and a single-fiber optical head, configured to interchangeably and releasably connect to the main housing structure and each enclosing a fixed relay lens;
   wherein the multi-fiber optical head is releasably connectable to a multi-fiber adapter tip configured to interface with multi-fiber optical-fiber connectors to be inspected and wherein the single-fiber optical head is releasably connectable to a single-fiber adapter tip configured to interface with single-fiber optical-fiber connectors to be inspected.

12. The optical-fiber connector endface inspection microscope system as claimed in claim 11, further comprising:
   at least one multi-fiber adapter tip releasably connectable to the multi-fiber optical head and comprising a multi-fiber optical-fiber connector interface for mechanically engaging with a multi-fiber optical-fiber connector to be inspected; and
   at least one single-fiber adapter tip releasably connectable to the single-fiber optical head and comprising a single-fiber optical-fiber connector interface for mechanically engaging with a single-fiber optical-fiber connector to be inspected.

13. The optical-fiber connector endface inspection microscope system as claimed in claim 11, wherein the relay lens of the multi-fiber optical head and the relay lens of the single-fiber optical head have mutually different dimensions.

* * * * *